INVENTORS
DOMINIC AMARA
HENRY F. REMPT
By *George C. Sullivan*
Agent

United States Patent Office 3,007,051
Patented Oct. 31, 1961

3,007,051
OPTICAL INFRARED SIGHT SYSTEM
Dominic Amara, Sherman Oaks, and Henry F. Rempt, Van Nuys, Calif., assignors to Lockheed Aircraft Corporation, Burbank, Calif.
Filed Apr. 24, 1956, Ser. No. 580,390
3 Claims. (Cl. 250—83.3)

This invention relates to target sighting and tracking apparatus for use in aircraft and relates more particularly to combined optical and infrared sighting and computing systems for weapon fire control.

Prior to our invention, optical sighting and lead computing gunsights had been introduced and image converters sensitive to distant infrared energy emitting targets had been proposed. However, these image converters were not practical for weapon fire controls in high speed modern aircraft since the target image was only presented for view through a visual eyepiece and it was proposed that the pilot should sight or look through the eyepiece in tracking and locating the target. No provision was made to combine or integrate the signal or image from the infrared target detecting device with the optical computing fire control system.

It is a general object of the present invention to provide a practical, effective and compact combined optical and infrared aircraft fire control system. The invention is in the nature of a combination infrared energy image converter and optical computing sight which facilitates "blind" tracking and firing on airborne targets. The visual image provided by the infrared image converter is projected on the combining glass of the computing gunsight so that the pilot may fly his airplane to align the target with the reticle on the glass. Thus, during night combat and under other conditions where the regular optical computing sight is ineffective or limited in its ability, the pilot flies his airplane to align the target presentation produced by the infrared sight on the combining glass, for instance the intersection of visible lines, with the reticle of his optical computing sight which is also projected onto the combining glass. Under conditions where visual contact is possible the target will be seen directly in line with the visible presentation of the infrared device. At long range, radar may be employed for target acquisition after which the initial approach may be based on radar position information until target acquisition is accomplished by the infrared system. The range is closed to within firing range and the pursuing aircraft oriented into firing position by employing the infrared information projected on the combining glass. If, during the final approach, visual contact is made with the target, the pilot at his discretion may use either the visual or infrared target presentation. Since the two presentations are superimposed, no confusion results and no change in flight course is required.

Another object of the invention is to provide an infrared optical sight system of this character wherein certain optical elements of the lead computing gunsight are utilized to handle and transmit the visual light image produced or provided by the infrared target detector means, thus reducing the size, weight and complexity of the installation. In practice, the movable prediction combining mirror, the collimating lens and associated parts of the optical sight transmit the converted infrared image to the combining glass of the sight to be viewed by the pilot as a single target image or to be superimposed with the visual target image.

Another object of the invention is to provide a combined infrared optical sight system of this kind wherein the converted infrared target image is directed and optically handled by optical system elements independent of the optical sight to be projected onto the combining glass of the sight for viewing by the pilot. This form of the invention is desirable and useful where the physical construction and arrangement of the optical sight and associated equipment permits or makes it more practical to merely project the target indication of the infrared sight onto the glass without passing through the optical elements of the computing sight.

A further object of the invention is to provide a system as described, characterized by an infrared image converter operable to produce a well discernible light display of the target and that minimizes the affects of clouds, terrain, and other conditions which may have a tendency to reduce the discernability of the target presentation due to infrared background radiation, etc.

Other objectives and features of the invention will become apparent from the following detailed description of typical preferred embodiments and applications wherein reference will be made to the accompanying drawings in which.

The embodiment of the invention illustrated in FIGURES 1 and 3 to 6 inclusive may be said to comprise, generally, an infrared energy receiving lens and direction changing system 10, an image converter 11 receiving the infrared energy from the system 10 and converting it into a visual light cross representing the target image, and an optical system 12 projecting the light cross or image to the reflector or combining glass 13 of the associated computing sight.

Figure 1:
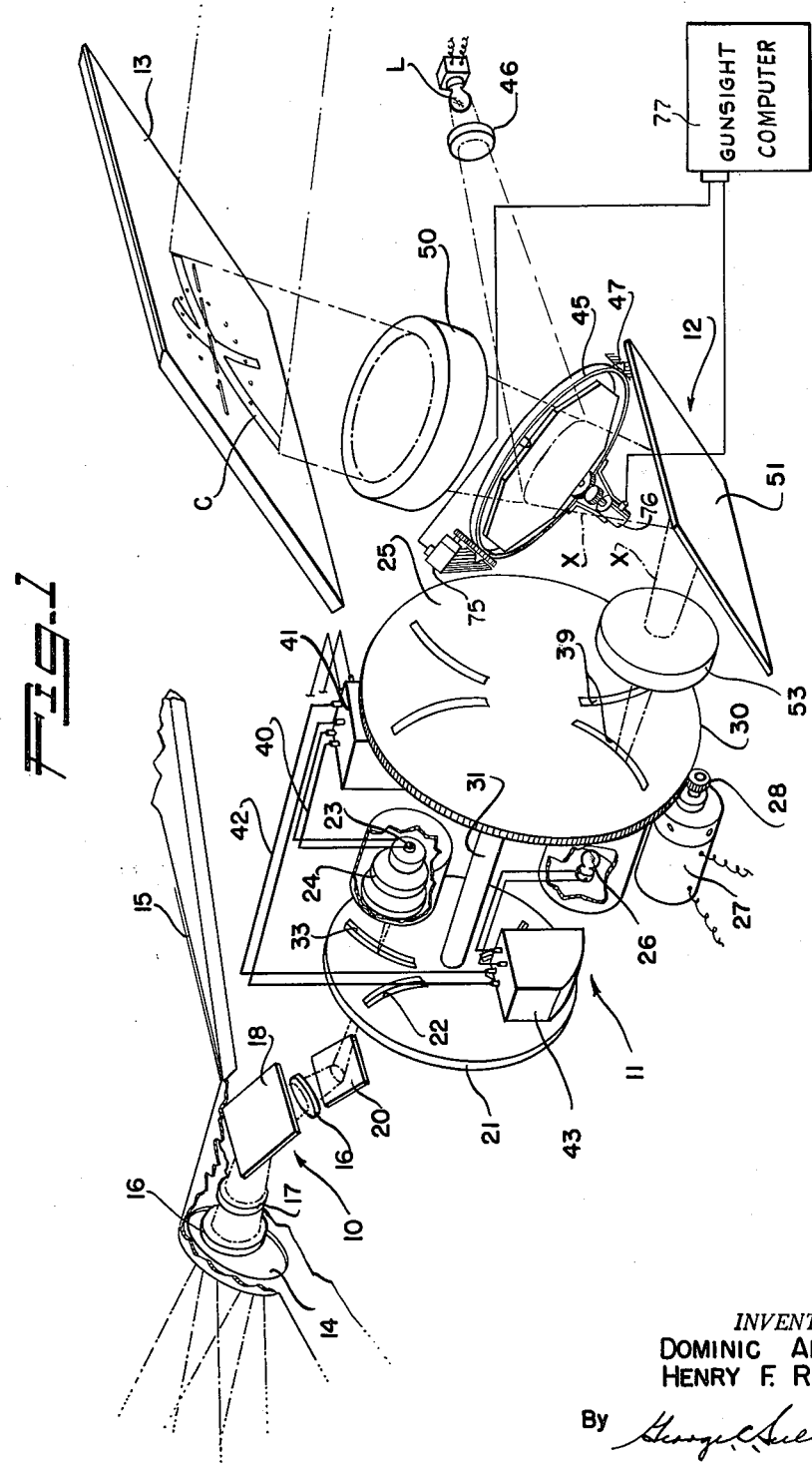
FIGURE 1 is a diagrammatic perspective illustration of one embodiment of the invention with the broken lines illustrating the paths of the infrared energy and the light in the system and as projected on the pilot's combining glass.
Figure 3:
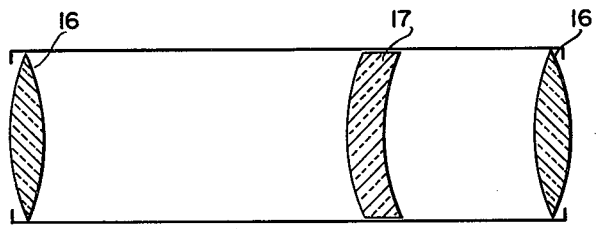
FIGURE 3 is a diagrammatic view of the objective lens of the infrared energy receiving portion of the system.

The infrared energy from the target may be received through the windshield, a window, or other glazed aperture of the airplane. In practice, we have found it desirable to provide a fused quartz window 14 for receiving the infrared energy from the targets. This window 14 may be adjacent and below the windshield 15 of the airplane although it is apparent the window 14 may be positioned elsewhere as found most desirable. The objective lens system 10 serves to condense or concentrate the infrared target energy and to direct the concentrated energy beam to the image converter 11. As shown in FIGURES 1 and 3, the system 10 includes a triplet objective lens combination made up of two spaced bi-convex lenses 16 and a concavo-convex lens 17 therebetween. The triplet 16—17 is positioned behind the window 14. In the particular case illustrated, a reflector 18 is arranged between the lens 17 and the inner lens 16 to change the direction of the infrared energy beam and a second reflector 20 is spaced behind the triplet to again alter the direction so that the infrared energy is properly directed into the image converter 11. It is to be understood, of course, that the reflectors 18 and 20 may or may not be required, depending upon the particular installation and the relationship between the energy receiving window 14 and the image converter 11.

The image converter 11 serves to convert infrared energy emitted by the target and transmitted through the window 14 and lens system 10 into a visual light beam preferably in the form of a cross of light lines. The converter comprises a rotating disc 21 having a plurality of slots 22 through which the infrared energy passes, a photoelectric cell or photo-conducting cell 23 to be acted upon by this energy, a field lens 24 between the disc 21 and the cell 23 for concentrating the infrared energy beam on the cell, a rotating slotted scanning disc 25 and a light source 26 triggered by the energy received by the photocell 23 to pass light through the slotted disc 25. The two scanning discs 21 and 25 of the image converter 11 are rotated together or in synchronism. Any selected means may be utilized to drive the two discs. In FIGURE 1 we have shown an electric motor and speed reducing gear unit 27 driving a pinion 28 which meshes with peripheral teeth 30 on disc 25 and the two discs 21 and 25 are secured to a common rotatable shaft 31 so as to rotate in unison.

Figure 6:
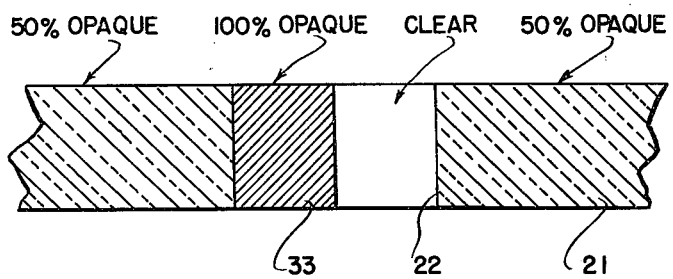
FIGURE 6 is an enlarged framentary sectional view of the infrared energy scanning disc.

The slits or slots 22 in the disc 21 are so shaped and related that each successive slot is oriented at generally right angles to the adjacent slot. In practice the slots 22 are somewhat arcuate and are arranged in pairs with the slots of each pair curving or converging generally toward the axis of rotation of the disc 21. While the disc 21 may be opaque to the infrared energy except for the slots 22, we prefer to make the disc itself substantially 50% opaque except for the slots 22 of which one half of each is entirely transparent and the other half (regions 33 along the slots) are 100% opaque. The opaque regions 33 are preferably of the same width as the slots 22 and parallel the slots. The above described relationship is illustrated in FIGURE 6. With this construction the level of intensity of the infrared energy transmitted through the disc 21 to the photoelectric cell 23 is substantially uniformly reduced except at the times it is affected by the completely opaque regions 33 and the fully transparent slots 22. As a result, the infrared energy transmitted by the slots 22 is better discriminated relative to the self, stray or reflected infrared energy emanating from clouds and other background than would be the case where the disc 21 is fully opaque except for the slots 22.

Figure 4:
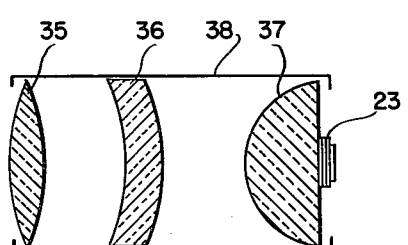
FIGURE 4 is a diagrammatic view of the field lens at the photo cell unit.

The objective lens means 10 and the associated mirrors or reflectors 18 and 20 are constructed and arranged to direct the beam of infrared energy along a path normal to the plane of the rotating disc 21 to pass through the slots 22 in a general area intermediate thereof. The field lens 24 and the photoelectric cell 23 are arranged behind the rotating infrared scanning disc 21 to intercept or receive this beam as "scanned" by the slotted disc 21 in the form of scanning lines crossing each other. As shown in FIGURES 1 and 4 the field lens assembly 10 may comprise or constitute a triplet made up of a bi-convex lens 35, a concavo-convex lens 36, and a plano convex lens 37. These lenses are housed in tube 38. The photoelectric cell 23 may be arranged or secured directly on the flat rear face of the lens 37 and may be a lead sulfide cell or a cell of other photoconductive infrared sensitive material.

The visual scanning disc 25 is an opaque member rotating simultaneously, or in synchronism, with the infrared scanning disc 21 and the disc 25 has a series of light admitting or passing slots 39. The slots 39 may be of the same configuration and arrangement as the slots 22 of the disc 21. The photoelectric cell 23 is connected in a circuit 40 leading to a pre-amplifier 41 and leads 42 extend from the amplifier 41 to a second amplifier 43. The amplifier 43 in turn supplies current to the light source 26 which is preferably in the form of a gas filled glow modulator or gas discharge tube. Thus it will be seen that infrared energy transmitted through the slots 22 of the disc 21 falls upon the photoelectric cell 23 to produce energy responses which are amplified by the amplifiers 41 and 43 to energize or trigger the light source 26. Visible light from the source 26 passes through the slots 39 of the disc 25 in the form of a cross or light image representative of the target and relative target position and then passes through the optical system 12.

Figure 5:
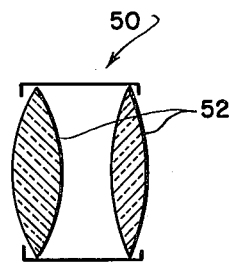
FIGURE 5 is a diagrammatic view of the collimating lens for the visual light images.

The optical system 12 serves to direct the visible light from the image converter 11, just described, onto the pilot's combining glass 13 of the computing gunsight with which the invention is employed. In accordance with the invention the infrared sight system may be incorporated in or used with any selected or required computing optical gunsight. For example, the optical gunsight may be of the single gyro type such as the K-14, the K-19, which are known in the art and manufactured by the General Electric Company under these designations. A better understanding of the construction and operation of these gunsights may be obtained by referring to publications of the General Electric Company on this subject such as Report No. GEI-49108 dated November 1954 and entitled "Handbook of Operating and Service Instructions for K-19 Gyro Computing Sight." See also United States Patents 2,467,831, 2,550,482, 2,756,625, and 2,859,655 all assigned to the General Electric Company. In such a gunsight there is a predicting mirror 45 supported by a gimbal means 47 for relative movement to direct light from a reticle 46 in accordance with the computations or predictions of the gunsight. Suitable servo-drive motors 75 and 76 which are controlled by outputs from the gunsight computer 77 may be employed to maintain predicting mirror 45 properly oriented. In FIGURE 1 we have shown a light source or lamp L supplying a light beam to the reticle 46 for subsequent reflection or redirection by the relatively movable prediction mirror 45 so as to form a light image on the face of the combining glass 13. In accordance with the invention the optical system 12 for directing the visual light image from the image converter 11 to the combining glass 13 employs or includes the predicting mirror 45 and the collimating lens 50 of the optical computing gunsight. The relatively movable prediction mirror 45 is a partially transparent mirror and as shown by the broken lines X in FIGURE 1 the visible light passing through the slots 39 of the disc 25 is reflected through the prediction mirror 45 by a reflector 51. After passing through the prediction combining mirror 45 this light is made parallel by the collimating lens 50 so that the display appears as a sharp cross C on the combining glass 13. The cross C, as shown in FIGURE 1, is seen by the pilot, that is its light is reflected by the glass 13 into the eyes of the pilot. While the invention is not primarily concerned with the details of the collimating lens 50 it may comprise a pair of properly related biconvex lenses 52, as shown in FIGURE 5. As will be apparent from the foregoing and from FIGURE 1, the target presentation or image produced by the image converter 11 and the reticle presentation provided by the reticle lamp 47 may be separately or simultaneously presented on the combining glass 13, depending upon atmospheric and light conditions.

If desired or found necessary, optical field curver 53 may be arranged between the visible light scanning disc 25 and the reflector 51 to correct for the curved image field.

Figure 2:
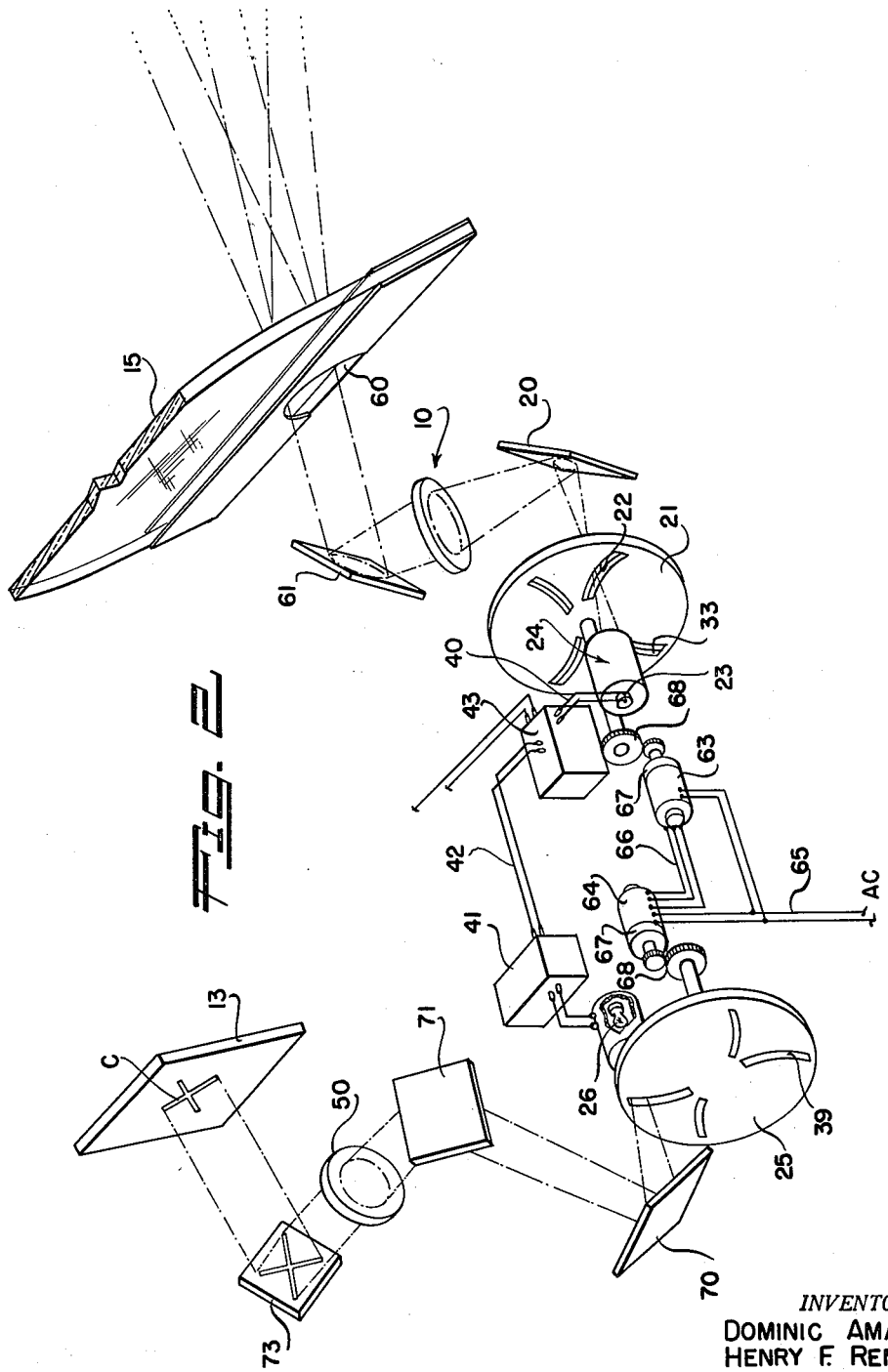
FIGURE 2 is a view similar to FIGURE 1 illustrating another embodiment of the invention.

FIGURE 2 of the drawings illustrates a form of the invention wherein the visual light representing the target image and produced by the infrared image converter is presented on the combining glass 13 without being passed through the optical elements of the gunsight. Parts and elements of this embodiment corresponding with the parts and elements of the structure shown in FIGURE 1 will have corresponding reference numerals. In FIGURE 2 the infrared energy emitted from the target is received through a "window" portion 60 of the windshield or a separate infrared window 15 is reflected by mirror 61 through the objective lens means 10 to a second reflector 20 so as to pass through the slots 22 of the rotating scanning disc 21. The photoelectric cell and field lens unit 23—24 may be the same as above described and receives the infrared energy image from the slots 22 to control or modulate the circuit 40 for triggering the light source 26. The light source 26 applies the visible light which is scanned by the rotating disc 25 to pass through the slots 39 thereof in the form of a cross-shaped light beam representing the target and its position. While the discs 21 and 25 of the image converter may be rotated in synchronism in the same manner as in FIGURE 1, we have shown a synchronous motor drive means for the discs which avoids the necessity for a common drive shaft and permits the discs to be located in remote positions with respect to one another and arranged in any required angular relationship. This drives means includes synchronous motors 63 and 64 supplied with a power circuit 65 and an interconnecting three wire circuit 66. These motors 63 and 64 drive their respective scanning discs 22 and 25 through speed reducing gear boxes 67 and gear and pinion sets 68.

As in the previously described form of the invention the visible light from the source 26 passes through the slots 39 of the disc 25 in a position radially of the disc corresponding to the position of the target with respect to the pursuing airplane and in the form of a cross-shaped light beam. This beam of light is reflected or changed in direction as required by mirrors 70 and 71 to pass through the collimating lens 50. The light beam straightened by the lens 50 is directed onto the combining glass 13 of the optical sight by a mirror 73. It will be observed that suitable mirrors or reflectors 70—71 and 73 appropriately arranged in the optical system permit the infrared energy responsive and image converting system to be associated as required with the optical sight in such a manner that the beam of light representative of the target position is properly presented on the combining glass 13.

It is believed that the operation of the combined optical and infrared sight system will be readily understood from the foregoing detailed description. Operating procedure employing the combined sight is essentially unchanged from the procedure used with a simple or conventional optical computing sight. The pilot flies his aircraft to align the target representation within the reticle on the combining glass 13. When employing the optical sight head the target aircraft is viewed by the pilot and aligned with the reticle. In the present combined system when tracking and firing upon a target at night or under other conditions where optical vision is obscured, the pilot aligns the intersection of the projected beam of light X on his viewing screen 13 with the reticle. The intersection of this cross-shaped beam coincides with the target position and under flight conditions where visible contact is also possible the target will be seen in alignment with this intersection. A long range radar may be employed for target acquisition. Following this acquisition the initial approach may be made on the basis of radar position information until acquisition is fully accomplished with the infrared system. The range may be closed to within firing range and the airplane oriented into firing position by employing the infrared information, that is by utilizing the cross-shaped light beam or light representation C presented on the screen or glass 13. In the event visual contact is made during the final approach the pilot may use either the optical or infrared target presentation since both are alike and superimposed.

Having described only typical forms of the invention we do not wish to be limited to the specific details herein set forth, but wish to reserve to ourselves any variations or modifications that may appear to those skilled in the art and fall within the scope of the following claims.

We claim:

1. In an aircraft fire control system having a combining screen and an optical gunsight computer for projecting thereon a reticle image giving the correct line of sight lead angle for a target, an infrared image converter comprising, means receiving infrared energy emitted by a target, lens means collecting said energy in the form of a beam, rotatable slotted scanning disc means arranged to allow said energy collected by said lens means to pass freely therethrough only at the slots, a second light source, photoelectric cell means behind the disc means exposed to said energy passing through the slots to trigger said second light source and thereby produce light, slotted scanning disc means rotatable with the first mentioned scanning disc and converting the light from said second light source into a visible light beam representing the target and its actual line of sight relative position, said slotted disc means comprising discs having corresponding sets of correspondingly shaped and arranged generally radial arcuate slots, means for rotating the discs, and means directing the last named light beam onto the screen for comparison with the reticle image.

2. In an aircraft fire control system having a combining screen and an optical gunsight computer for projecting thereon a reticle image giving the correct line of sight lead angle for a target, an infrared image converter comprising, means receiving infrared energy emitted by a target, lens means collecting said energy in the form of a beam, rotatable slotted scanning disc means arranged to allow said energy collected by said lens means to pass freely therethrough only at the slots, a second light source, photoelectric cell means behind the disc means exposed to said energy passing through the slots to trigger said second light source and thereby produce light, slotted scanning disc means rotatable with the first mentioned scanning disc and converting the light from said second light source into a visible light beam representing the target and its actual line of sight relative position, each of said slotted disc means comprising a rotatable disc having sets of arcuate slots curving towards the axis of rotation, the first mentioned slotted disc means having at least a portion thereof bordering one side of each slot opaque, means for rotating the discs, and means directing the last named light beam onto the screen for comparison with the reticle image.

3. An infrared image converter comprising, a viewing screen, means receiving infrared energy admitted by a target, lens means collecting said energy in the form of a beam, rotatable slotted scanning disc means arranged to allow said energy collected by said lens means to pass freely therethrough only at the slots, a second light source, photoelectric cell means behind the disc means exposed to said energy passing through the slots to trigger said second light source and thereby produce light, slotted scanning disc means rotatable with the first mentioned scanning disc and converting light from said second light source into a visible light beam representing the target and its actual line of sight relative position, each of said slotted disc means comprising a rotatable disc having sets of arcuate slots curving toward the axis of rotation, the first mentioned slotted disc means having at least a portion thereof bordering one side of each slot opaque, means for rotating the discs, and means directing the visible light beam onto the viewing screen.

References Cited in the file of this patent

UNITED STATES PATENTS

| | | |
|---|---|---|
| 1,699,270 | Baird | Jan. 15, 1929 |
| 1,781,799 | Baird | Nov. 18, 1930 |
| 2,028,475 | Rockwell | Jan. 21, 1936 |
| 2,225,097 | Cawley | Dec. 17, 1940 |
| 2,406,451 | Borkenstein | Aug. 27, 1946 |
| 2,426,184 | Deloraine et al. | Aug. 26, 1947 |
| 2,752,684 | Bentley et al. | July 3, 1956 |
| 2,877,354 | Fairbanks et al. | Mar. 10, 1959 |
| 2,882,416 | Fairbanks et al. | Apr. 14, 1959 |

FOREIGN PATENTS

| | | |
|---|---|---|
| 412,905 | Great Britain | Sept. 26, 1932 |